M. H. L. SIZAIRE.
DASHBOARD OF AUTOMOBILE VEHICLES.
APPLICATION FILED JAN. 22, 1920.

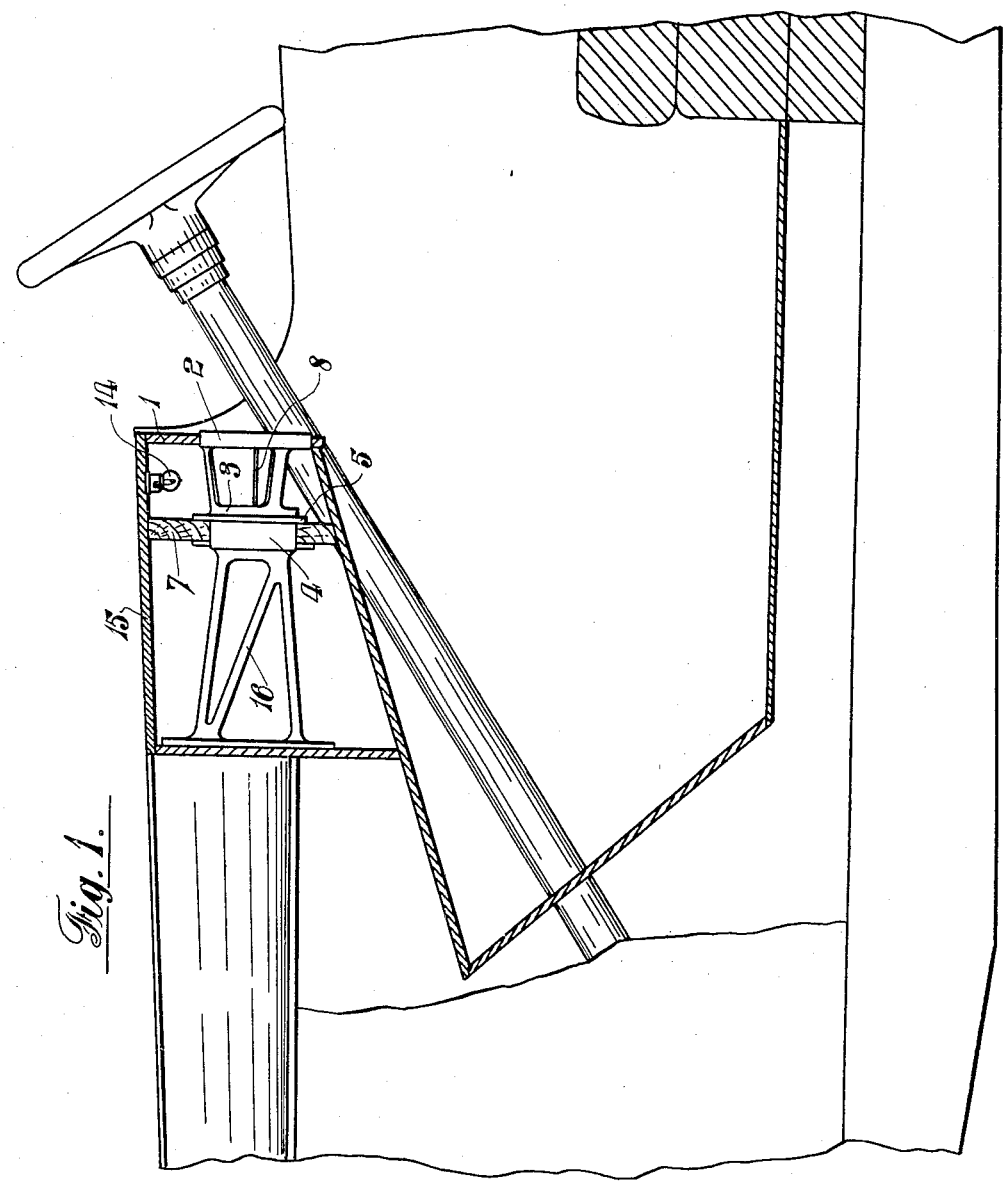

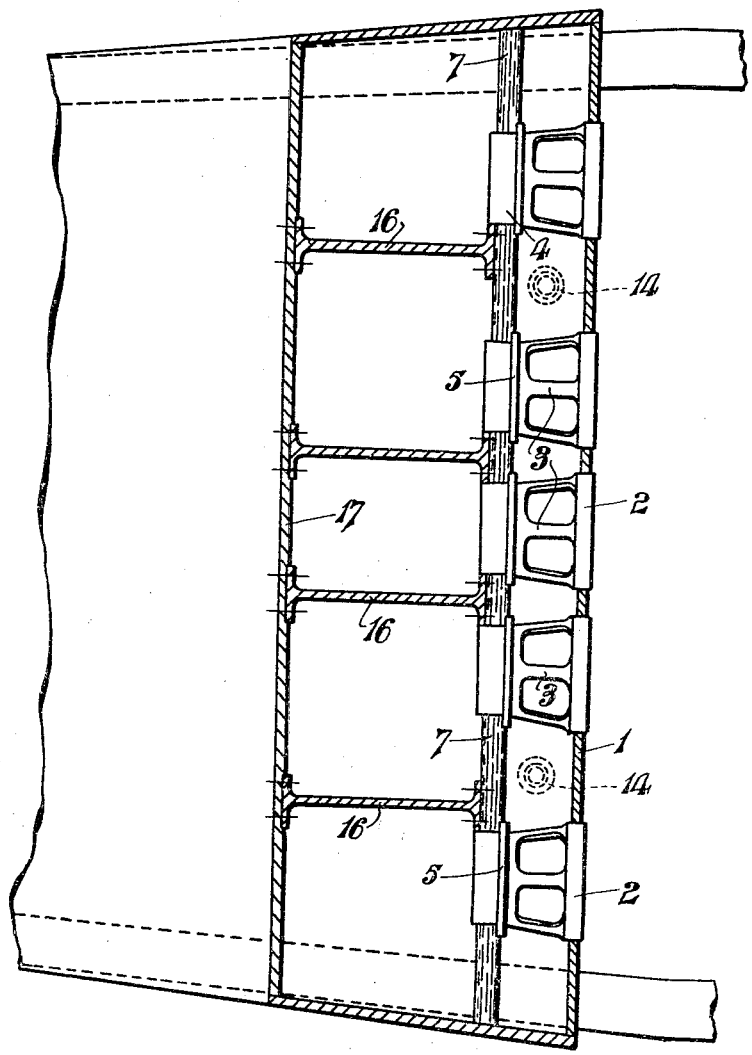

1,371,522.

Patented Mar. 15, 1921.
3 SHEETS—SHEET 3.

Inventor-
Maurice L. L. Sizaire,
By B. Singer.
Atty.

UNITED STATES PATENT OFFICE.

MAURICE HIPPOLYTE LOUIS SIZAIRE, OF LONDON, ENGLAND.

DASHBOARD OF AUTOMOBILE VEHICLES.

1,371,522.  Specification of Letters Patent.  Patented Mar. 15, 1921.

Application filed January 22, 1920. Serial No. 353,189.

*To all whom it may concern:*

Be it known that I, MAURICE HIPPOLYTE LOUIS SIZAIRE, a citizen of the French Republic, residing at Park Royal, London, N. W. 10, England, have invented new and useful Improvements in and Relating to Dashboards of Automobile Vehicles and the like, of which the following is a specification.

This invention relates to dashboards of automobile vehicles and the like and has for its object to provide improvements in the construction thereof whereby the various instruments mounted thereon can be illuminated at will to render them more easily discernible at night.

It has been found in practice inconvenient to employ lamps the light of which is directed onto the face of the dashboard on account of the shadows cast by the hands or other indicating means employed on the instrument and consequent difficulty of making quick and accurate readings. Furthermore the employment of lamps to illuminate the dashboard in this manner has the effect of interfering with the vision ahead of the person driving the car. The present invention is designed to overcome these difficulties and provide means for illuminating a dashboard from its rear side, *i. e.*, from the side farthest away from the driver.

According to the invention a dashboard is provided with a number of openings which are filled by sheets of porcelain or other translucent material on which the dials or scales of instruments such as a speedometer, revolution counter, petrol level indicator, oil pressure and level indicator and/or other instruments are marked, means being provided to illuminate such dials or scales from their rear sides.

The invention will be more readily understood by reference to the drawings in which:—

Figure 1 is a side elevation of part of an automobile with the dashboard partly in section.

Fig. 2 is a plan view of Fig. 1,

Figure 4:
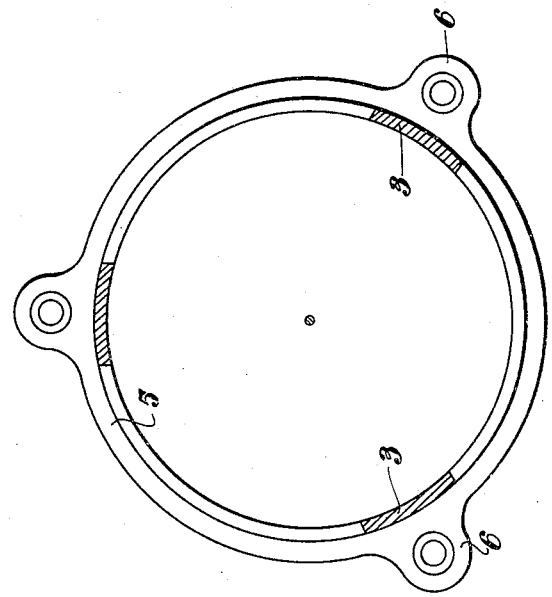
Fig. 4 is a section taken on line A—A Fig. 3.
Figure 3:
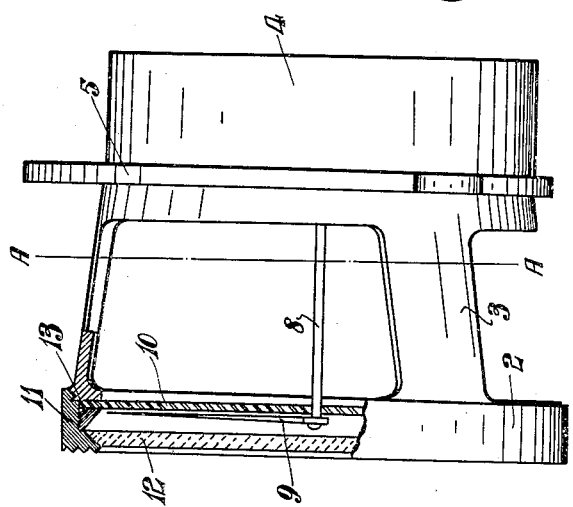
Fig. 3 shows a translucent dial mounted in a skeleton framework or cage.

In the drawings, 1 is an instrument board secured to the body of an automobile in the well known manner having a series of openings into which are fitted the front ends of the skeleton framework or cages 3. The rear end of the framework or cage is provided with a flange 5 carrying lugs 6, which latter are secured to a supporting board 7 by screws or other suitable means.

The instrument proper is positioned behind the flange 5 in the rear end 4 of the skeleton framework or cage and has an elongated spindle 8 forming a connection between the instrument and the indicating needle or hand 9, thus operating the latter over the scale or graduations on the translucent dial 10 which may be made of porcelain, muranese glass or the like. The forward end of the skeleton framework or cage is fitted with a clamping ring or the like 11 carrying a transparent glass cover 12 and a metal bezel 13 forming a distance member between the glass cover 12 and instrument dial 10.

A series of small incandescent electric lamps 14 is disposed along the framework 15. Although only two such lamps are shown in the drawing any number may be employed as found to be convenient in practice. It will be seen that the skeleton framework or cage freely permits the rays of light to fall upon the rear side of the transducent dial 10 whereby an easy and accurate reading is obtained, the needle or hand being free from any shadow and showing up distinctly in contrast to the illuminated dial 10 of the recording instrument.

Furthermore the vision ahead of the person driving the car is not hampered by any glare of light as in the case of an instrument board illuminated on its face side *i. e.*, the side facing the driver of the car.

Brackets 16 are employed to maintain rigid the supporting member 7 and are secured to the backboard 17 of the bonnet of the car, by any suitable means. These brackets 16 may vary in number according to the width and length of the supporting member 7 to suit special circumstances.

Any number of indicating or recording instruments may be employed and mounted on the dashboard in the manner shown and the invention is not limited to the number, character or disposition of the dials shown in the drawing or the particular construction shown for mounting the skeleton framework or cages relatively to the supporting member 7.

It is to be understood that the invention is not limited in its application to automobiles as it can be applied as readily and with equal effect to aircraft.

I claim:—

1. An automobile instrument board, skeleton frameworks fitted into said instrument board and projecting rearwardly therefrom, translucent dials secured in the forward ends of said frameworks, instruments secured in the rearward ends of said frameworks and illuminating means mounted rearwardly of said dials.

2. An automobile instrument board, skeleton frameworks fitted into said instrument board and projecting rearwardly therefrom, translucent dials secured in the forward ends of said skeletons, instruments secured in the rearward ends of said skeletons, elongated spindles for said instruments projecting through said dials, indicating hands secured upon said spindles and illuminating means disposed behind said dials.

3. An automobile instrument board, skeleton frames fitted into said instrument board and projecting rearwardly therefrom, a transverse supporting member for said frames disposed behind said instrument board, translucent dials secured in the forward ends of said frames, instruments secured in the rearward ends of said frames and illuminating means mounted behind said dials.

4. An automobile instrument board, skeleton frames fitted into said instrument board and projecting rearwardly therefrom, a transverse supporting member for said frames disposed behind said instrument board, translucent dials secured in the forward ends of said frames, instruments secured in the rearward ends of said frames, elongated spindles for said instruments projecting through said dials, indicating hands secured upon said spindles and illuminating means mounted behind said instrument board.

5. An automobile instrument board, a bonnet extension, skeleton frames, a support disposed transversely across the interior of said bonnet extension, means for securing said frames at their forward ends in said instrument board and at their rearward ends to said support, translucent dials mounted in the forward ends of said frames, instruments mounted in the rearward ends of said frames and illuminating means mounted rearwardly of said instrument board.

In testimony whereof I affix my signature.

MAURICE HIPPOLYTE LOUIS SIZAIRE.

Witnesses:
A. R. J. RAMSEY,
H. PETER VENN.